United States Patent [19]

Mnilk et al.

[11] 4,221,760

[45] Sep. 9, 1980

[54] METHOD OF MAKING, FILLING AND CLOSING CONTAINERS OF THERMOPLASTIC MATERIAL

[75] Inventors: Reinhold Mnilk, Wambel; Manfred Kurreck, Bochum-Weitmar; Ulrich Geltenpoth, Wickede; Manfred Keil, Dortmund, all of Fed. Rep. of Germany

[73] Assignee: Holstein & Kappert GmbH, Dortmund, Fed. Rep. of Germany

[21] Appl. No.: 540,035

[22] Filed: Jan. 9, 1975

[30] Foreign Application Priority Data

Jan. 9, 1974 [DE] Fed. Rep. of Germany ....... 2400850

[51] Int. Cl.² ............................................. B29C 17/07
[52] U.S. Cl. ..................... 264/524; 53/453; 53/140; 264/525; 264/542; 425/524
[58] Field of Search ......................... 264/524, 525, 542; 425/524; 53/453, 140

[56] References Cited

FOREIGN PATENT DOCUMENTS 461110 11/1949 Canada ........................................ 53/140
1180301 10/1964 Fed. Rep. of Germany ........... 264/524

*Primary Examiner*—Jan H. Silbaugh
*Attorney, Agent, or Firm*—Michael J. Striker

[57] ABSTRACT

Successive increments of a thermoplastic tube are extruded in vertical direction from an orifice, and a first partible mold is closed about the increment immediately downstream of the orifice whereupon the increment is expanded to the shape of a first semi-finished container, while simultaneously completing the expansion of the neck region of an already filled second semi-finished container accommodated in a second partible mold downstream of the first mold and communicating with the interior of the first container, is completed. The containers are then sealed and separated from one another and the first container in the first mold is filled. The second container is discharged from the second mold and the relative positions of the molds are reversed in preparation for repetition of the preceding steps.

1 Claim, 2 Drawing Figures

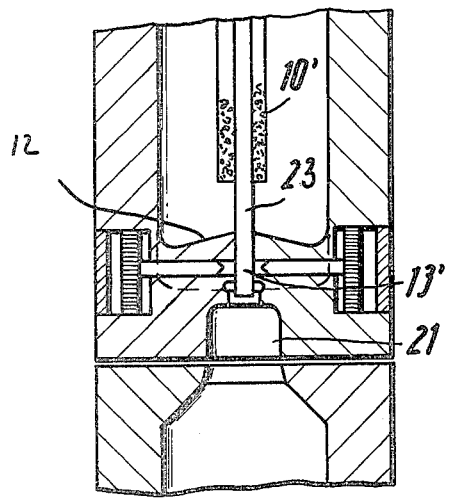
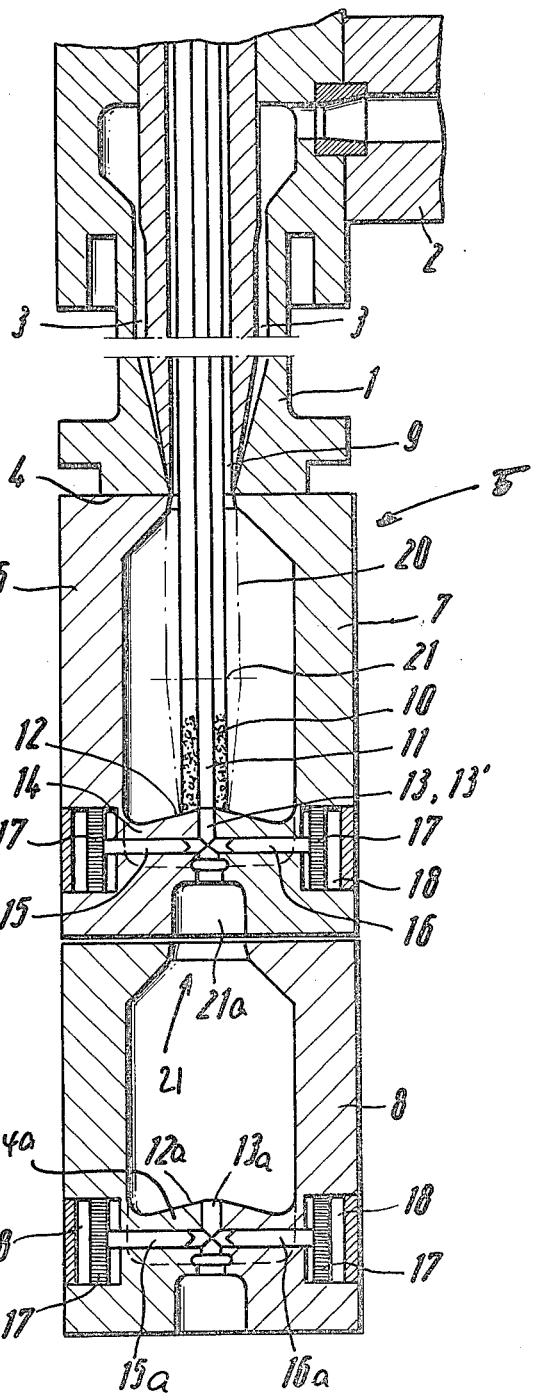

METHOD OF MAKING, FILLING AND CLOSING CONTAINERS OF THERMOPLASTIC MATERIAL

BACKGROUND OF THE INVENTION

The present invention relates generally to the making, filling and closing of containers of thermoplastic material, and more particularly to a novel method of making, filling and closing containers of thermoplastic material and to an apparatus for carrying out the method.

It is already known to make containers from thermoplastic material by extruding the material from an extrusion head, expanding the extruded tubular thermoplastic material by blow-molding to the shape of a container, and thereafter fill the container by means of a filling tube which is located within the extrusion head nozzle. Subsequently, transversely movable welding elements close the upper end of the filled container and the container is then placed onto a conveyor for removal.

It is also known to extrude a tube of thermoplastic material and to surround it by partible molds which move at the same speed at which the continuously extruded thermoplastic tube moves. The increment of the tube that is enclosed in the mold is then expanded by blow-molding to form a container which is filled while it is still connected with the advancing extruded tube, and which is thereupon closed by welding and separated from the tube. The extruded thermoplastic tube is initally deformed in the neck and bottom regions of the container by individual neck and bottom forming devices, and only subsequently is it deformed intermediate these regions to form the major part of the container. In between these operations a previously formed container is filled while the tube increment located in the upper or preceding mold is being expanded, and the container that is being expanded is supported only at its bottom. This prior-art approach requires a great number of individual components for an apparatus to carry it into effect, since the bottom and neck regions of the container are formed separately from one another, and then the major portion of the container is also formed separately, and all of these components must be operated in timed relationship which requires substantial maintenance and therefore labor expenses. Also, it is very difficult to appropriately center the mold sections due to wear and other problems, and it is impossible to produce sterile containers in this manner since the blow-molding and filling tube which follows the movement of the molds is made to travel freely and unprotectedly through the atmosphere during the idling phase, where it can become contaminated.

Still other prior-art approached are known and also suffer from various disadvantages which make them unsuitable for many applications.

SUMMARY OF THE INVENTION

It is a general object of this invention to overcome the disadvantages of the prior art.

More particularly it is an object of the present invention to provide an improved method of making, filling and closing containers of thermoplastic material.

Another object of the invention is to provide an improved apparatus for carrying out the method.

A concomitant object is to provide such a method and apparatus which permit a reliable and accurate shaping of the neck region of a thermoplastic container without requiring additional and separate shaping arrangements, as does the prior art.

Still a further object of the invention is to provide such an improved method and apparatus wherein the molding, filling and closing can be carried out more quickly and in a less complicated manner than is known from the prior art.

Still a further object of the invention is to eliminate the loss of thermoplastic material intermediate to successive containers that are being formed, which is conventional in the prior art and can add substantially to manufacturing costs.

In keeping with these objects, and with others which will become apparent hereafter, one feature of the invention resides in a novel method of making, filling and closing containers of thermoplastic material. According to one aspect of this invention, the method comprises the first step of extruding successive increments of a thermoplastic tube in vertical direction from an orifice, the second step of closing a first partible mold about the increment immediately downstream of the orifice and expanding this increment to the shape of a first semi-finished container, while completing the expansion of the neck region of an already filled second semi-finished container accommodated in a second partible mold downstream of said first mold and communicating with said first carrier. Thereupon, the third step is effected of sealing and separating the containers from one another, followed by the fourth step of filling the first container in the first mold, the fifth step of discharging the second container from the second mold, and the sixth step of reversing the relative positions of the molds in preparation for repetition of the preceding steps.

The first partible mold which is used to surround the extruded tube increment immediately downstream of the orifice is so positioned relative to the orifice that there is substantially no distance between them.

In this manner it is possible to not only blow-mold the container in the first mold, but simultaneously also to finish the molding of the neck region of an already filled container in the second mold, and the pressure relief of this neck region can be carried out simultaneously with the pressure relief of the container in the first mold, or independently thereof.

According to a further aspect of the invention, the first increment immediately downsteam of the extrusion orifice can be expanded and filled, advanced during extrusion of the successive next increment by a distance corresponding substantially to the length of this increment, and closed with reference to the new increment except for a small communicating passage. Thereupon, the next successive increment is blow-molded to expand it and at the same time a finish molding of the neck region of the already filled container is initiated, whereupon the communication between the interiors of the two containers is terminated and a final molding of the neck region of the original container may be carried out with a successive pressure relief, while the upper newly-molded container is being filled and the communication between the two containers is severed after the neck region of the lower container has been relieved. In this manner it is possible to reliably form even the already slightly cooled neck region of the previously produced filled container, either by using high pressure and/or by using pressure over a longer period of time. Also, a pressure relief of the neck region can be carried out independently of the upper newly-molded container, and in every instance the time is sufficient to properly form the neck region of the lower containers since the upper container must initially be first formed from the tube increment and thereupon be filled.

A further concept of the invention provides that after forming and filling of a container produced from a tube increment the container is moved downwardly by substantially the length of a newly extruded tube increment, and is closed by insertion of an inlet and outlet conduit for blow-molding air, except for a communication opening which connects it with the new increment of the tube and which is necessary to permit the molding of the neck region of the previously formed container. Substantially during the molding of the new increment into a container the neck region of the previously formed container is also formed and thereupon pressure relieved. The conduit is thereupon removed, leaving a communication passage between the two containers, this passage is then closed while the upper container is filled and is subsequently moved onwardly to assume the position previously assumed by the lower container. By admitting and removing blow-molding air into the already filled lower container it is possible in a simple manner, even when working with difficult-to-handle materials, to provide a reliable admission of air for formation of the neck region, and this conduit used for the admission also serves to separate the newly produced increment of the tube which is to be expanded to form a container, from the already finished lower container.

The apparatus according to the present invention will be described hereafter, and it should be understood that this apparatus makes it possible to make, fill and close containers of thermoplastic material in a substantially continuous manner by using two corresponding particles which are movable lengthwise of the tube being extruded, stagewise and/or continuously with the extruded tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial section through the important part of an apparatus for carrying out the invention; and FIG. 2 is a view analogous to FIG. 1, but illustrating a different embodiment.

DESCRIPTION OF THE PREFERRED EMBODIMENTS

Referring now to the drawing in detail, and describing first FIG. 1, it will be seen that the exemplary apparatus illustrated in this Figure has an extrusion head 1 which is connected with a nozzle 2 having an outlet 3 from which thermoplastic material is extruded in vertically downward direction in form of a tube. The lower end face 4 of the head 1 has abutting against it a first partible mold 5 which is composed of two mold sections 6 and 7 which move between open and shut positions (the shut position is shown in the drawing). The abutment is essentially without gaps or spacing. A second corresponding partible mold 8 is provided which can be moved into the position of the mold 5 while at the same time the mold 5 moves to the position which is illustrated in FIG. 1 for the mold 8. In other words, the molds 5 and 8 alternate in assuming the position illustrated for the mold 5 in FIG. 1. Coaxially to the outlet nozzle 3 of the head 1 there is provided a blowing air channel 9 with a filter tube 10 which is centered in it. The air channel 9 serves to supply blowing air which is necessary for blow-molding the tube increment surrounded by the respective mold, and also to support a not-as-yet enclosed tube increment (during the replacement of one mold with another) and can also be used to vent the interior of a blow-molded container by connecting it to suction rather than of compressed air.

Arranged within the filler tube 10 is a further blow-molding air conduit 11 which can also be connected via non-illustrated valves to a source of suction instead of compressed air. The bottom 12 or 12a of the respective molds 5, 8 is formed with an opening 13, 13a, respectively. The inwardly extending portion of the respective bottom 12, 12a is slightly conical in configuration and the embodiment of FIG. 1 and serves as a sealingly engageable seat, as well as a support for the filler tube 10 which can be moved upwardly and downwardly in axial direction. The bottom wall 12, 12a is also formed with ribs 14, 14a which extend towards the interior of the container produced in the respective mold and in which transversely movable welding elements 15, 16 and 15a, 16a are guided which can move normal to the longitudinal axis of the respective mold. These elements can be moved inwardly and outwardly by respective pistons 17, 17a located within cylinders 18, 18a, to weld the thermoplastic material shut intermediate the containers in the molds 5 and 8, and also to separate two successive containers from one another if desired.

The bottom 12 of the mold 5 is formed in its downwardly directed surface with a recess which accommodates a portion 21a of the neck region 21 of a container that is located in the mold 8 beneath the mold 5. The upper end of the container that is to have its neck formed is located within the bottom region of the upper container, so that the two containers can be separated from one another when the time has come, without wasting material.

The tube increment 20 which hangs freely in the mold 5 and is supported by the supply of air via the channel 9, assumes approximately the broken-line position shown in FIG. 1 after the two mold sections 6 and 7 of the mold 5 have moved to closed position. In the bottom 12 their remains a communicating opening 13' which is closed by the welding elements 15 and 16 during the initial production of a container from a tube increment 20, so that a forming of the tube increment 20 by expanding it against the walls bounding the mold cavity is possible. The lowe end face of the filler tube 10 is approximately at the broken-line level 21 at the beginning of this operation, and after the container is formed by blow-molding the bottom end of the filler tube 10 is moved towards the conical bottom wall 12 as the filler tube 10 is lowered. After the interior of the newly formed container is pressure relieved, filling can begin by admitting material through the filler tube 10, and when this is completed the first mold 5 is moved downwardly in closed condition to assume the position previously assumed by the mold 8, whose sections have meanwhile been moved to open position and are moved upwardly (outwardly spaced from the mold 5) until they are located at the level previously assumed by the mold 5, whereupon they move inwardly to closed position to surround a newly extruded tube increment 20.

As soon as the mold 5 has reached the lower position previously assumed by the mold 8, the sections of the mold 8 which have moved upwardly can be moved inwardly to engage the next tube increment 20. The new tube increment is then surrounded by the mold sections of the mold 8, but a communicating passage between it and the neck region 21 of the semi-finished container in the mold 5 remains. When blow-molding air is now admitted into the new tube section 20, it is communicated via the opening 13, 13' into the neck region 21 of the container in the mold 5. Immediately afterwards the lower end of the filler tube 10 engages the bottom wall 12 of the container that has just been formed in the mold 8, sealing the interior of the container with respect to the passage 13, so that now the interior of the neck region and the container accommodated in the mold 5 may if desired be placed at a higher pressure than the interior of the container in the upper mold 8, or else the interior of the neck region in the container in the lower mold 5 may be pressure relieved independently of the container in the mold 8. At this time the formation of the container in the mold 8 is completed and filling thereof now begins. As soon as the appropriate forming of the head region of the container in the lower mold 5 is completed, the elements 15, 16 move inwardly against the tube portion which forms the passage 13 and close the same, so that the two containers are now separated from one another and the filled finished container can be removed in closed condition from the mold 5. In the meantime the container in the mold 8 has also been filled, so that the filler tube 10 is now retracted to its starting position at the level 22. At this moment the mold sections 6,7 of the lower mold 5 move to open position and move upwardly, while the closed mold 8 is moved downwardly. The operation is now repeated.

The embodiment in FIG. 2 shows a somewhat different arrangement in which the filler tube 10' which almost contacts the bottom 12 is provided with a blow-molding air conduit 23 which can be shifted axially within it. The conduit 23 is moved prior to closing of the respectively upper mold 5 or 8 into the region of the upper opening of the communicating lower mold 8 or 5, and during the closing of the mold sections of the upper mold 5 or 8 it is surrounded thereby, so that a tight sealing effect with respect to the inner space of the tube increment 20 in the upper mold, and with respect to the neck space of the already filled container in the respective lower mold is obtained. When the blow-molding of a tube increment 20 in the upper mold begins, the neck portion of the container in the lower mold can simultaneously be expanded, for example at a pressure different from that used in the upper mold, to form it to the finished shape. The pressure relieving of the neck region of the container in the lower mold is also effected via the conduit 23 which for this purpose can be connected with the source of suction. As soon as the tube increment 20 in the upper mold has been formed to the shape of a container and has been filled, the conduit 23 is retracted to its upper position and during this time the filler tube 10' provides for sealing of the upper and lower containers relative to one another, as in the embodiment of FIG. 1. Immediately thereafter the passage 13' is closed by inward movement and operation of the welding elements 15 and 16. Subsequently the filler tube 10' is retracted to its starting position so that the cycle can be repeated.

It is clear that the apparatus can also be used for the making of containers which are not filled during the manufacture, in which case of course the supply of material to be introduced into the containers will be omitted.

It will be understood that each of the elements described above, or two or more together, may also find a useful application in other types of constructions differing from the types described above.

While the invention has been illustrated and described as embodied in the making, filling and closing of containers of thermoplastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making, filling and closing containers of thermoplastic material, comprising the steps of extruding an increment of a thermoplastic tube from an orifice in vertical direction; forming said increment by blow-molding to the shape of a semi-finished first container, and filling the same; extruding another increment of said tube, while moving said semi-finished container in said direction by a distance corresponding substantially to the length of said other increment but maintaining a connecting passage between the latter and said first container; shaping said other increment by blow-molding to the shape of a semi-finished second container while simultaneously completing the blow-molding of said first container to its finished shape, said shaping step comprising inserting conduit means for inlet and discharge of compressed air from said second container into said neck region of said first container; sealing said containers from one another, including removing said conduit means and closing said passage; and filling said second container.

* * * * *